United States Patent [19]

Peash

[11] 4,262,391
[45] Apr. 21, 1981

[54] WIRE CLAMP

[75] Inventor: Douglas E. Peash, Enumclaw, Wash.

[73] Assignee: The Boeing Company, Seattle, Wash.

[21] Appl. No.: 43,418

[22] Filed: May 29, 1979

[51] Int. Cl.³ .............................................. B65D 63/00
[52] U.S. Cl. ........................................... 24/18; 24/27; 24/28; 217/95; 285/254
[58] Field of Search ............... 24/18, 27, 28, 29, 26; 217/95; 285/340, 254

[56] References Cited

U.S. PATENT DOCUMENTS

| 188,886 | 3/1877 | Galvin | 285/254 X |
|---|---|---|---|
| 231,100 | 8/1880 | Richardson | 217/95 |
| 341,845 | 5/1886 | Hoke | 217/95 |
| 375,825 | 1/1888 | Lourie | 217/95 |
| 444,340 | 1/1891 | Dwelle | 217/95 |
| 584,517 | 6/1897 | O'Melveny et al. | 217/95 |
| 796,643 | 8/1905 | Harmon | 217/95 |
| 802,213 | 10/1905 | Hight | 217/95 |
| 834,408 | 10/1906 | Renz | 217/95 |
| 918,296 | 4/1909 | Drum | 217/95 |
| 1,128,244 | 2/1915 | Haley | 217/95 |
| 2,427,685 | 9/1947 | Midtlyng et al. | 285/254 X |
| 2,436,935 | 3/1948 | Ohler | 24/18 |
| 2,438,651 | 3/1948 | Schlegel | 24/18 |
| 2,458,252 | 1/1949 | Chatterton | 24/18 |
| 2,512,982 | 6/1950 | tinnerman | 24/18 X |
| 2,968,416 | 1/1961 | Rutten | 217/95 |
| 3,881,753 | 5/1975 | Bochory | 285/340 |

FOREIGN PATENT DOCUMENTS

| 126455 | 1/1948 | Australia | 24/28 |
|---|---|---|---|
| 155557 | 6/1932 | Switzerland | 285/254 |

*Primary Examiner*—Victor N. Sakran
*Attorney, Agent, or Firm*—James P. Hamley; Bernard A. Donahue

[57] ABSTRACT

A hose clamp includes a coupler body and spring wire. The coupler is substantially triangular in cross section, having a pair of passageway interconnecting two surfaces. The wire, having a head on one end, is routed through one passageway, around the hose and then through the remaining passageway being secured by a thrust washer to the opposite coupler surface.

3 Claims, 7 Drawing Figures

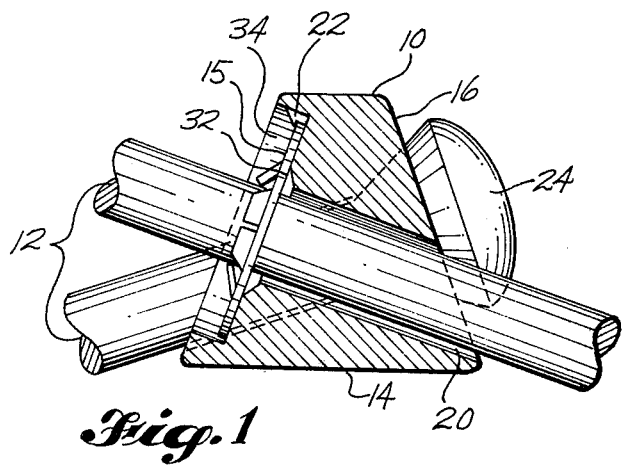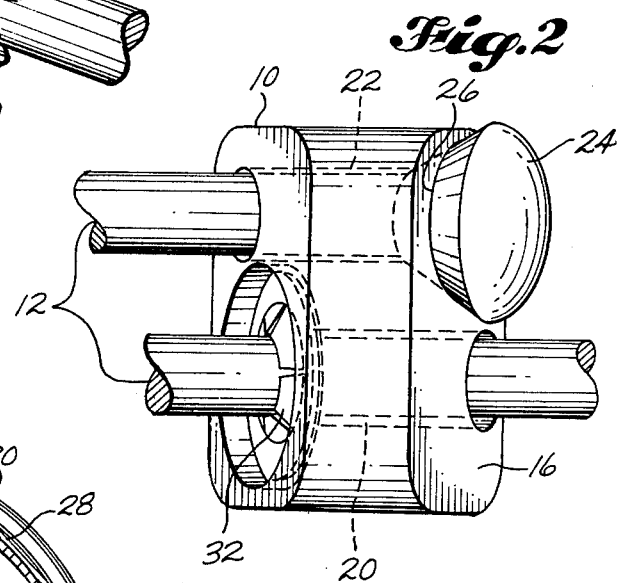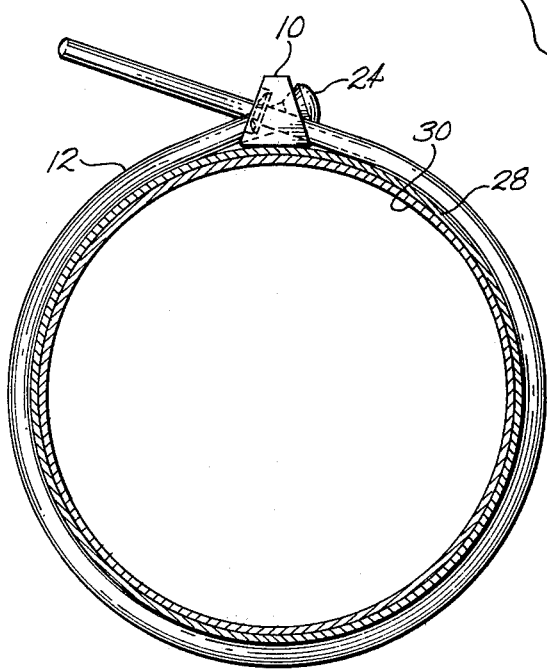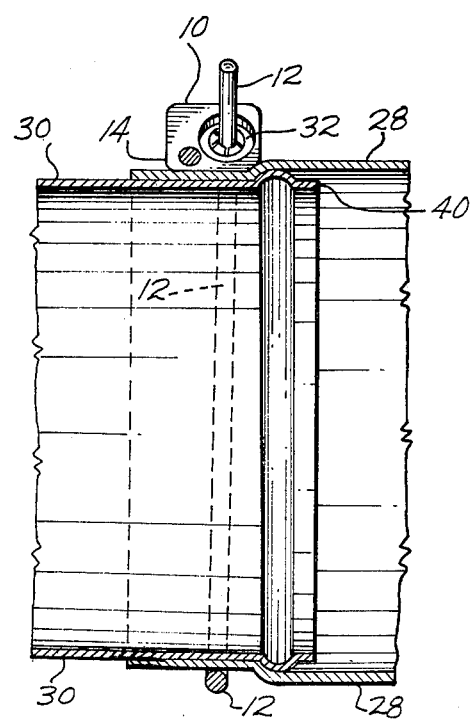

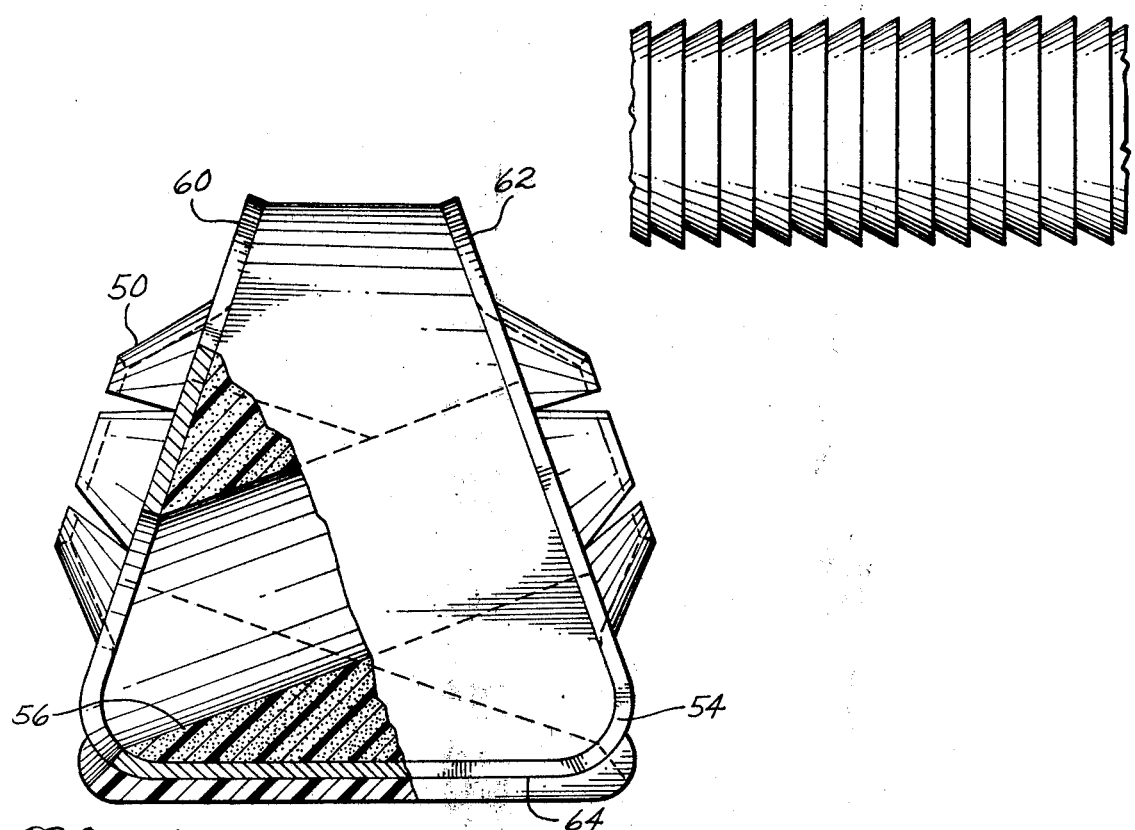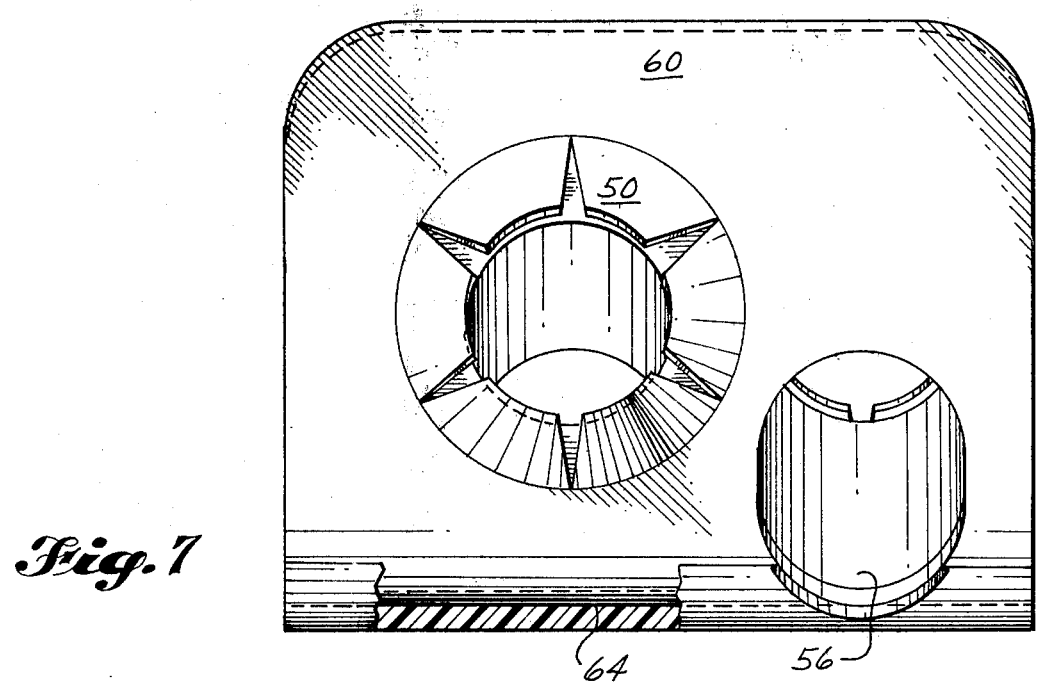

WIRE CLAMP

BACKGROUND OF THE INVENTION

This invention pertains to clamping devices and, in particular, to a spring latched wire hose clamp.

Numerous clamping devices and, more particularly, means for connecting hosing to tubing are well known in the prior art. Examples of the latter are nylon straps, metal band clamps and duct tape.

Nylon straps are similar to nylon cable ties and employ a serrated nylon strap which encircles the hose/tube assembly. A coupler at the end of the strap mates with the serrations thereon allowing the strap to be pulled tightly around the hose and, thus, mating the hose to the tubing. While nylon straps are relatively inexpensive, easy to install and light in weight they are prone to exhibit two defects. Firstly, after a period of time the nylon strap relaxes, thereby degrading the hose to tube joint. In addition, when nylon burns it gives off toxic gases thus making it undesirable for many applications, such as in commercial aircraft.

Metal band clamps employ a metal strap having a screw type coupler at one end. The strap encircles the hose and tube and is received and tightened in the screw coupler. As with the nylon strap, the metal band clamp exhibits basically two defects. Firstly, over a period of time the strap, which has sharp edges, tends to cut through the hose. Also, in applications such as commercial aviation, wherein a large number of such couplings are employed, the metal band clamp exhibits excessive weight.

A final hose/tube coupling which finds widespread use is duct tape. The tape, having an adhesive on one side, is wrapped around the hose/tube joint to form the coupling. A problem with duct tape is that after a period of time the adhesive cold flows resulting in a leaky duct.

One other relevant clamp known to the prior art is the band tie which has commonly been used to hold together the staves of a tub or tank. Here, a coupler, which is formed of two strong tubes cast together, receives rounded ends of a strap, which strap encircles the staves to be joined. The rounded ends of the straps are threaded, thus allowing the use of nuts to affix the strap ends to the coupling.

For numerous applications, such as hose clamps for use in commercial aviation, the prior art band tie does not suffice. Firstly, as with the metal band clamp, the band tie in time, cuts the edges of the hose. More importantly, however, the band tie is heavy and relatively complicated to manufacture and assemble.

Thus, there is a long felt need, particularly in the hose clamp art for use in commercial aviation, to provide a lightweight, simple to manufacture and assemble, long term effective clamping means.

SUMMARY OF THE INVENTION

It is an object of this invention, therefore, to provide an improved clamping means which is lightweight, easy to manufacture and assemble and which retains its clamping capabilities over a long time period.

It is a particular object of the invention to provide the above improved clamping means which is adapted to clamp hoses on commercial aircraft.

Briefly, according to the invention, a wire clamp for the joining together of members comprises a coupler having a substantially triangular cross section which defines first, second and third major surfaces. The first surface is adapted to be placed on at least one of the members to be joined. A pair of predetermindly dimensioned passageways are provided between the second and third surfaces. A wire, which is adapted to be located in a configuration to create a mating force on the members to be joined, has each of its ends routed through one of the coupler passageways extending from one of the second and third surfaces. A suitable securing means is associated with each wire end and the surface from which it extends to secure each of the ends to the coupler The wire at one end is provided with a head which frictionally engages the coupler in the area contiguous with the aperture of the passageway through which the wire end extends. A thrust washer frictionally engages serrations provided on the remaining wire end and is pressed against, and retained by the remaining coupler surface thereby completing the clamp assembly.

BRIEF DESCRIPTION OF THE DRAWINGS

FIG. 1 is a cross sectional view of the preferred embodiment of the coupler and spring latched wire clamp assembly;

FIG. 2 is a plan view of the assembly shown in FIG. 1;

FIG. 3 is an end view of the spring latched wire clamp shown coupling a flexible hose to a rigid duct;

FIG. 4 illustrates providing a serrated surface on the wire of the assembly to improve the coupler clamping action;

FIG. 5 is a side, cross sectional view of the wire clamp and hose/duct shown in FIG. 3;

FIG. 6 is a cross sectional view of the coupler containing integrally formed thrust washers; and FIG. 7 is an end view of the coupler shown in FIG. 5.

DETAILED DESCRIPTION OF THE PREFERRED EMBODIMENT OF THE INVENTION

FIG. 1 is a cross sectional view illustrating the preferred embodiment of the instant coupling, including a coupler body 10 and the wire 12.

The coupler 10 is, as shown, substantially triangular in cross section having first, second and third major surfaces 14-16, respectively. The first surface 14, as is better illustrated in FIG. 3, is adapted to be placed on one of the members to be joined.

A pair of passageways 20, 22 (better shown in FIG. 2) extend between the second and third surfaces 15, 16, respectively. The passageways 20, 22 are of predetermined dimension to receive the wire 12.

Preferably, the couplers are formed of metal, high temperature thermal plastic or other suitable material. The wire 12 is, preferably, provided with a head 24 at one end. The head is of sufficient dimension such that it frictionally engages the coupler in the area contiguous with the aperture of the passageway through which the wire extends. Thus, as is more clearly shown in FIG. 2, the wire 12 is routed through passageway 22 causing the head 24 to frictionally engage the area around the aperture 26 of the passageway into the third surface 16.

As shown in FIG. 3, the wire 12 encircles the members to be joined, in this case a flexible hose 28 which is placed over the end of a duct, or tube 30. After encircling the hose 28/tube 30 interface, the remaining end of the wire is routed through the passageway 20 and, as is best shown in FIG. 1, is frictionally engaged by a thrust washer 32 which is mounted within a recess 34 of the coupler body 10. A provided lip 36 retains the thrust washer 32 in place while the wire end is being pulled therethrough. In the conventional manner, the thrust washer 32 frictionally engages the wire end, thereby retaining it in position and providing a convenient means to tighten the wire 12 around the hose 28 and duct 30.

In some applications, the wire 12 may, of necessity be comprised of a hard metal, such as stainless steel or titanium. In such an event, the wire may be provided with a serrated surface, as shown in FIG. 4, to ensure a locking fit with the thrust washer 32.

FIG. 2 is a plan view of the coupler 10, wire 12 assembly shown in FIG. 1. This figure better illustrates the head 24 provided on the wire 12 and its mating arrangement in the aperture 26 of passageway 22. Also clearly shown is the remaining wire end which extends through passageway 20 and is retained in place by the thrust washer 32.

FIG. 3 is a cross sectional view illustrating a flexible hose 28 over the end of a rigid duct 30. Shown is the coupler body 10 receiving the ends of the spring wire 12, one end of which is provided with a head 24.

FIG. 4 illustrates providing the wire with a serrated surface to improve the locking fit with the thrust whasher. This is particularly useful for applications wherein hard wires must be employed.

FIG. 5 is a side, cross sectional view of the coupling and flexible hose/rigid duct assembly. Here, the coupler body 10 is shown having its first surface 14 resting on the flexible hose 28. The hose is force fit over the rigid duct 30 which is provided with a lipped end 40. The wire 12 is routed around the hose 28/duct 30 interface and is secured at one end by the thrust washer 32.

FIG. 6 is a cross sectional view of an embodiment of a coupler having thrust washers 50, 52 formed integrally with a sheet metal portion 54 of the coupler. The sheet metal portion surrounds a structural foam 56 which is employed to retain faces 60, 62 in place when clamping loads are exerted. This embodiment eliminates the need for a wire head, such as head 24 of FIG. 1.

An elastomer (or equivalent) cushion 64 is bonded onto the base of the coupler to prevent cutting into the clamped hose/duct material.

FIG. 7 is an end view of the coupler shown in FIG. 6.

In summary, an improved wire clamp has been described in detail. The clamp is lightweight, simple to manufacture and assemble and maintains an excellent coupling over a long time duration. Thus, the instant clamp is particularly well suited as a hose clamp in commercial aircraft.

While a preferred embodiment of the invention has been described in detail, it should be apparent that many modifications and variations thereto are possible, all of which fall within the true spirt and scope of the invention.

Thus, whereas the instant preferred embodiment of the invention has been illustrated as a hose clamp, it should be understood that use of the instant clamp for the joining together of any type members is contemplated.

I claim:

1. A wire clamp for the joining together of members comprising:
   a coupler means having a substantially triangular cross section defining first, second and third major surfaces, said first surface being adapted to be placed on at least one of said members to be joined, and a pair of predeterminedly dimensioned passageways being provided between said second and third surfaces;
   wire means adapted to be located in a configuration to create a mating force on the members to be joined, each end of said wire means being routed through one of said coupler passageways and extending from one of said second and third surfaces, one end of said wire means being provided with a head, said head being of predetermined dimension to frictionally engage the coupler in the area contiguous with the aperture of the passageway through which said wire extends thereby securing said one wire end to said coupler, the remaining wire end being provided with a serrated surface; and
   thrust washer means for frictionally engaging said wire end serrated surface to prevent relative slippage between said wire end and said thrust washer, said thrust washer being pressed against, and retained by said coupler surface.

2. A wire clamp for the joining together of members comprising:
   a coupler means comprised of a central foam material enclosed by a triangularly bent sheet metal portion forming a substantially triangular cross section defining first, second and third major surfaces, said first surface being adapted to be placed on at least one of said members to be joined, and a pair of predeterminedly dimensioned passageways being provided between said second and third surfaces;
   wire means adapted to be located in a configuration to create a mating force on the members to be joined, each end of said wire means being routed through one of said coupler passageways and extending from one of said second and third surfaces; and
   securing means comprising thrust washers formed integrally in said sheet metal portion and associated with each wire end to secure each of said ends to said coupler.

3. The wire clamp of claim 2 further comprising cushion means being secured to said sheet metal portion for providing a cushion between the sheet metal portion and the members to be joined.

* * * * *